April 29, 1952     M. R. WEINGARTEN     2,595,182
ADJUSTABLE CARRIER FOR CONVEYER SYSTEMS
Filed Oct. 7, 1948
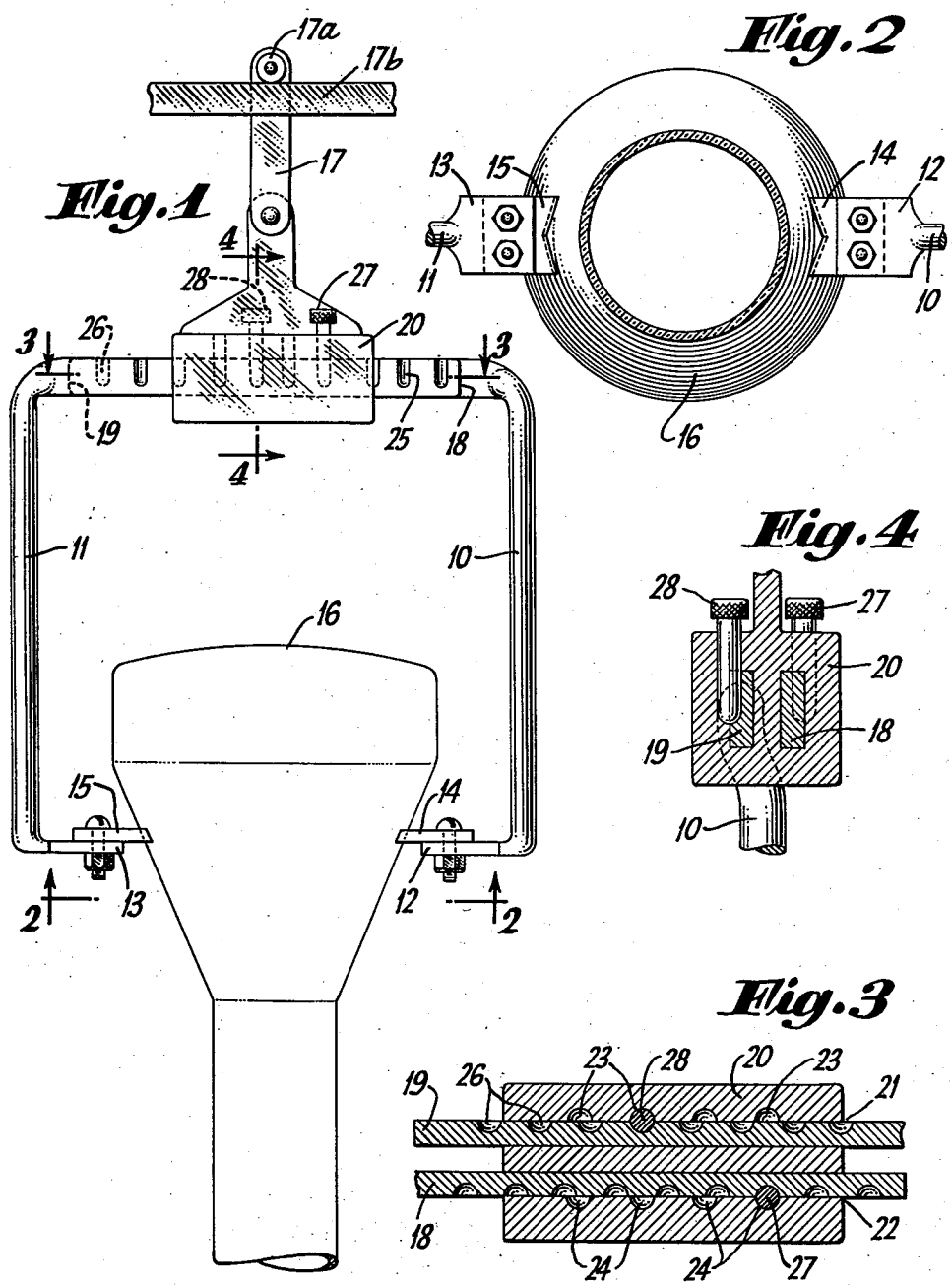
INVENTOR
MORRIS R. WEINGARTEN
BY
William A. Balesak
ATTORNEY Patented Apr. 29, 1952

2,595,182

UNITED STATES PATENT OFFICE 2,595,182

ADJUSTABLE CARRIER FOR CONVEYER SYSTEMS

Morris R. Weingarten, Lancaster, Pa., assignor to Radio Corporation of America, a corporation of Delaware Application October 7, 1948, Serial No. 53,341

10 Claims. (Cl. 198—131)

This invention relates to carriers for conveyor systems and more particularly to an adjustable carrier for engaging work pieces of different sizes in a critical manner.

Mass production methods of manufacture make liberal use of conveyors for transporting work pieces from station to station. One element of a conveyor system comprises the carrier which is in actual support engagement with the work pieces. In some instances the shape and fragility of the work pieces create problems that directly concern the carrier of a conveyor system. In addition to being suitable for handling a fragile and irregularly shaped object, such as a cathode ray tube, in a critical manner, the carrier may also be required to transport the work pieces in an inclined path between stations located at different levels. Furthermore, in instances where the work pieces are of different sizes, it is necessary that the carrier be adjustable to accommodate the differences in size of the work pieces. Cathode ray bulbs, for example, come in different sizes, thus, making adaptability of a conveyor system to different sizes of bulbs an important characteristic. Moreover, since it is the function of a conveyor system to receive and deliver work pieces in a plurality of loading and unloading operations, it is important that these operations be easily accomplished.

It is accordingly an object of the invention to provide an improved carrier for a conveyor system to thereby widen the usefulness of the system.

Another object is to provide an easy and accurately adjustable carrier for a conveyor system to adapt the system to differently sized work pieces and to specially shaped objects such as cathode ray tubes.

A further object is to provide a carrier for transporting work pieces in an inclined path.

A still further object is to provide a carrier for a conveyor system for supporting fragile objects against breakage.

An additional object is to provide a carrier for a conveyor system that contributes to ease in loading and unloading operations.

Further objects and advantages of the invention will become apparent as the present description proceeds.

Referring to the drawing:

Figure 1 shows a front elevation of the carrier of the invention supporting a cathode ray bulb;

Figure 2 is a cross-section along the line 2—2 of Figure 1 and shows the means for engaging the walls of the bulb;

Figure 3 is a section along 3—3 of Figure 1 and illustrates the adjustable feature of the carrier of the invention; and Figure 4 is a section along the line 4—4 of Figure 1 and shows a further aspect of the adjustable feature of the carrier.

Referring to the drawing in greater detail, there is shown in Figure 1 the improved carrier of the invention. This carrier includes arms 10 and 11 having free ends 12 and 13 on which are mounted inserts 14 and 15 made of a material that results in a minimum of harm to the load and which may be plywood. The load in the illustrated example is a cathode ray tube 16, the conical walls of which are engaged by the inserts 14 and 15. The carrier is supported from depending member 17, which may ride on roller 17a engaging an overhead rail 17b. Suitable power means, not shown, is employed for causing the carrier to travel on the rail. The arms 10 and 11 terminate in upper elongated portions 18 and 19, more clearly shown in Figure 3, which portions are disposed in overlapping relation for a purpose to be more fully described hereinafter. The carrier also includes a yoke or manifold 20 having two passageways 21 and 22 extending therethrough for receiving the upper end portions 18 and 19 of the arms 10 and 11.

According to the invention the ends 12, 13 of arms 10, 11 and the inserts 14 and 15 mounted on said ends are spaced sufficiently to engage the cathode ray bulb 16 at a portion of its conical wall, which will result in a hanging support of the bulb 16 by the carrier. For a proper carrying out of the invention, it is essential that the inserts 14 and 15 engage a wall portion of the bulb that is spaced a critical distance from the ends thereof. This requires a critical spacing of the inserts 14 and 15 from each other. If this spacing is too large, for example greater than the largest diameter of the bulb, the entire bulb will slip through the space between the inserts and will be incapable of support by the carrier. On the other hand, if this space is too small it will result in engagement by the inserts of a lower portion of the bulb below its center of gravity, with a consequent toppling of the bulb from the carrier.

In accordance with the invention therefore, means are provided for critically adjusting the space between the inserts 14 and 15. This means includes the yoke 20 and the passageways 21 and 22 extending therethrough, as well as the elongated end portions 18 and 19 of arms 10 and 11. As shown in Figure 3, the elongated end portions referred to extend into passageways 21 and 22 for sliding movement therein. Each of these passageways is provided with vertically extending grooves 23 and 24, the grooves in each passageway being spaced from each other a predetermined and critical distance. The elongated end members 18 and 19 are also provided with grooves 25 and 26 extending transversely thereof and parallel to the grooves 23 and 24. Grooves 25 and 26 are also critically spaced from each other but the spacing therebetween is different from the spacing between grooves 23 or 24. This difference in spacing is designed to permit a vernier adjustment between the yoke 20 and each of the elongated end members 18 and 19.

The manner in which this vernier adjustment is accomplished is illustrated in Figure 3. It will be noted that in the position of the elongated end member 19 shown, only one of the grooves 23 thereon is in registry with one of the grooves 26 on the yoke 20. This is because the spacing between adjacent ones of groove 26 and adjacent ones of groove 23, is not the same. Thus, the spacing between adjacent grooves 26 is slightly greater than that between adjacent grooves 23. In causing the end members 18 and 19 to slide through the passageways 21 and 22, therefore, different grooves will assume registry depending upon the position of the end members 18 and 19 in the passageways. Once a desired position of the end members in the passageways has been reached, cylindrical members 27 and 28 having knurled knobs for convenience in handling, are inserted into the cylindrical spaces provided by the registering grooves, to fix the end members in the yoke.

The difference in spacing between adjacent ones of grooves 23 and 26 and between adjacent ones of grooves 24 and 25, may be made sufficiently small to permit an extremely fine adjustment in the separation of arms 10 and 11, and consequently, in the spacing of object supporting inserts 14 and 15. In addition, the yoke 20 and elongated end members 18 and 19 may be provided with calibrations indicative of the spacing suitable for specific objects.

This extremely fine adjustment is particularly advantageous in handling cathode ray bulbs since the shape of the conical portion of the wall of the bulb which is engaged by the carrier of the invention, is of such character that a slight variation in the separation of inserts 14 and 15 results in a substantial longitudinal shift of the bulb on the carrier. This ability to give a longitudinal shift to the bulb on the carrier is desirable for a proper positioning of the bulb thereon, but unless a fine adjustment of the carrier is possible this shift may be large enough either to cause the bulb to slip through the carrier, or to dispose the center of gravity of the bulb above the inserts 14 and 15 to thereby cause the bulb to topple from the carrier, as has been indicated before herein.

The support of the carrier on member 17 for oscillation in one plane is advantageous when employing the carrier for transporting objects in an inclined path from one level to another. In this situation the carrier is mounted in such a fashion as to cause its plane of oscillation to coincide with the plane in which the direction of travel lies. As a consequence, the carrier and the object supported thereby will always depend vertically from support 17 whether the path traveled by the carrier be horizontal or inclined.

A further respect in which the carrier of the invention is particularly suitable for transporting cathode ray bulbs is the ease with which it permits bulbs to be loaded on the carrier and removed therefrom. As shown in Figure 1, the spacing between the bulb support inserts 14 and 15 is smaller than the largest diameter of the bulb, but larger than a diameter of the neck portion 29 of the bulb. Thus, a slight lifting of the bulb 16 from its support results in clearance between its walls and the supporting inserts 14 and 15.

The inserts 14 and 15 may be made of a resilient heat insulating material such as wood and as shown in Figure 2 may be provided with a V-shaped edge for engaging the bulb wall, or if desired, this edge may be rounded. This shaping and composition of the inserts accomplish firm but resilient engagement thereof with the side wall of the bulb when the bulb is resting thereon but affords an easy release when the bulb is slightly raised therefrom. The heat insulating character of the inserts 14 and 15 is important in that it avoids strains that might result from the engagement of a hot bulb by a cold metal body.

It will therefore be appreciated that the carrier of the invention affords a firm and resilient support for fragile objects while permitting the objects to be easily mounted thereon and removed therefrom. In manufacturing operations where bulbs are frequently moved from one conveyor system to another, these characteristics are of great importance. In addition, the carrier of the invention is critically adjustable to make it suitable for a variety of differently sized objects and particularly for use with cathode ray bulbs where the portion of the wall to be engaged is critical.

Various modifications may be made in the invention without departing from its spirit and scope as pointed out in the appended claims.

What is claimed is:

1. A conveyor system comprising a conveyor rail and an object carrier supported on said rail for travel thereon and for oscillation in one plane, said carrier comprising a pair of members having spaced parallel sides, legs on said members extending toward each other in opposed relation, the ends of two of said legs being in registry and spaced from each other to form tongs for receiving an object to be carried, two others of said legs extending towards each other in overlapping relation, means for slidingly receiving said two others of said legs and for adjusting the separation of said first mentioned two legs, said means including a yoke having scalloped inner walls, and means for fixing the separation of said others of said legs, said means comprising two rods engaging a scallop on each of said walls and said other of said legs.

2. A carrier for a conveyor system comprising a tong-shaped member having two arms and a transverse portion therebetween, the free ends of said arms being spaced to receive an object to be transported by said carrier, and means for varying the length of said transverse portion to accommodate said free ends to differently sized objects, said means comprising a slide yoke having two passageways therethrough, said transverse portion comprising two separate members slidably disposed in said passageways, said members and said passageways having opposed recesses therein, forming two cylindrical spaces when in register, two cylindrical members disposed in said two spaces for fixing said two separate members with respect to said yoke, the walls of said passageways including raised surfaces between said recesses spaced to permit a successive opposed disposition of said recesses with respect to the recesses in said two separate members.

3. A carrier for transporting an object in an inclined path, comprising a tong-shaped structure having a transverse portion supported for oscillation in the plane of said path, whereby said tong-shaped structure depends vertically while traveling in said path, the free ends of said tong-shaped structure having a shape to substantially conform to a contour of said object, and means for varying the spacing between said free ends, said means including a yoke having two passageways extending therethrough, the transverse portion of said tong-shaped structure comprising two mutually movable arms, said arms extending into said passageways for sliding movement therein, and means for fixing said movable arms with respect to each other and said yoke, said means comprising walls in said yoke and sides of said arms having recesses forming tubular spaces, and rod-like members snugly fitting into said spaces.

4. A carrier for transporting an object comprising a tong-shaped structure having free ends for engaging said object, and means for varying the separation of said free ends for accommodating the carrier to differently sized objects, said means comprising a yoke having two passageways extending therethrough and supported in a vertically pendent position, said passageways having vertical grooves spaced from each other a predetermined distance, said tong-shaped structure including a transverse portion comprising two separable elongated portions, said separable elongated portions extending into said passageways for sliding movement therein, said portions having vertical grooves spaced from each other a distance different from said predetermined distance, whereby only one groove in each of said passageways and one groove on each of said portions are capable of opposed relation at one time to form two tubular spaces, and two rod-like members filling said spaces for fixing the position of said portions with respect to said yoke.

5. An object carrier for a conveyor comprising a U-shaped structure having free ends for engaging an object to be transported and means for varying the spacing between said free ends, said means comprising the transverse portion of said U-shaped structure and a yoke having two parallel passageways extending therethrough, said transverse portion comprising two separable elongated arms extending into said passageways for sliding movement therein, and means for fixing said arms in said passageways in a critically adjusted relation, said last-named means comprising transversely grooved sides on said arms and walls in said passageways having grooves oppositely disposed with respect to said transversely grooved sides, only one groove on each of said arms and said passageways being capable of registry at one time, the grooves on one of said arms and the wall of one of said passageways being capable of registry successively in response to a sliding movement of said one of said members in said one of said passageways, and a rod fitting snugly into said grooves when in registry.

6. An object carrier for a conveyor comprising two members having at adjacent ends thereof two arms disposed in overlapping relation, the opposite ends of said members being spaced from each other to receive therebetween an object to be carried, and means for adjustably fixing said two arms with respect to each other to permit said spaced ends to accommodate differently sized objects, said means comprising a yoke having two passageways extending therethrough for receiving said two arms, said passageways having a plurality of recesses on one wall thereof, said arms having a plurality of recesses on one side thereof facing said one wall, and a rod-like member having transverse dimensions so as to fit between said one wall of said passageways and said one side of said arms when two opposed of said recesses are in registry.

7. A carrier as claimed in claim 4 and wherein resilient heat insulating inserts are mounted on said free ends for resiliently engaging said bulbs.

8. A conveyor for conically shaped objects including a pivoted support, a tubular member mounted on said pivoted support, a pair of oppositely disposed supporting arms having extensions slideably received within said tubular member for permitting movement of said arms toward and away from each other, said tubular member and said extensions having recesses which can be registered to form tubular chambers, means for locking said arms against relative movement, said means comprising a rod-like member extending into a registered one of said recesses, and insulating supporting elements carried on the free ends of said arms and having V-shaped recesses therein for receiving a conical object therebetween.

9. A conveyor for conically shaped objects including a pivoted support, a tubular member mounted on said pivoted support, a pair of oppositely disposed supporting arms having extensions slidingly received within said tubular member for permitting movement of said arms toward and away from each other to vary the spacing therebetween, means for locking said arms against relative movement, said extensions and said tubular member having recesses which can be registered to form tubular chambers, said means including a pin received within one of said tubular chambers, and heat and shock insulating supporting elements carried on the free ends of said arms for receiving a conical object therebetween.

10. An object carrier for a conveyor system comprising a pair of members mounted in opposed relation to form a tonged structure adapted to carry an object, a yoke having walls defining two passageways for slidingly receiving portions of said members for adjusting the size of said structure for receiving any one of different sized objects, said walls having elongated recesses therein, said portions having elongated recesses in surfaces thereof facing said walls, the recesses in said portions being differently spaced from each other than the recesses in said walls, whereby only one of said recesses in said walls is adapted to be placed in registry with only one of the recesses in one of said portions to form a confined space when said structure is adjusted to a predetermined size, and a member having a cross-section for snugly fitting into said space to lock said one of said portions against relative movement with respect to said yoke.

MORRIS R. WEINGARTEN.

REFERENCES CITED

The following references are of record in the file of this patent:

UNITED STATES PATENTS

| Number | Name | Date |
|---|---|---|
| 1,280,933 | Wright | Oct. 8, 1918 |
| 1,550,248 | Gehnrich | Aug. 18, 1925 |
| 1,578,120 | Harris | Mar. 23, 1926 |
| 1,742,074 | Hires | Dec. 31, 1929 |
| 2,060,722 | Breslav | Nov. 10, 1936 |
| 2,092,396 | Jennings | Sept. 7, 1937 |
| 2,235,992 | Hapman | Mar. 25, 1941 |
| 2,291,492 | Naysmith | July 28, 1942 |
| 2,337,178 | Breslav | Dec. 21, 1943 |
| 2,493,807 | Frederick | Jan. 10, 1950 |